United States Patent [19]

Bennett

[11] Patent Number: 4,970,681

[45] Date of Patent: Nov. 13, 1990

[54] METHOD AND APPARATUS FOR CORRELATING DATA

[75] Inventor: Ralph F. M. Bennett, Middlesex, England

[73] Assignee: Book Data, Ltd., Middlesex, England

[21] Appl. No.: 110,268

[22] Filed: Oct. 20, 1987

[30] Foreign Application Priority Data

Oct. 20, 1986 [GB] United Kingdom ............... 8625057
Oct. 21, 1986 [GB] United Kingdom ............... 8625183

[51] Int. Cl.⁵ .................................................. G06F 1/00
[52] U.S. Cl. ................................. 364/900; 364/419;
364/974; 364/963; 364/927.2; 364/930;
364/928
[58] Field of Search ............... 283/1 R, 35, 36, 39,
283/44, 48, 55, 60 R, 72; 40/382, 384, 360, 489,
490; 340/826.31; 235/380; 364/200, 300, 900,
419

[56] References Cited

U.S. PATENT DOCUMENTS

| 4,114,139 | 9/1978 | Boyd et al. ............ 340/825.31 |
| 4,151,330 | 7/1979 | Ross ........................ 283/55 |
| 4,186,871 | 2/1980 | Anderson et al. ....... 340/825.31 |
| 4,364,586 | 12/1982 | Ott .......................... 283/55 |
| 4,675,669 | 6/1987 | Goldman ................... 283/72 |

FOREIGN PATENT DOCUMENTS

| 0127424 | 12/1984 | European Pat. Off. . |
| 0167860 | 1/1986 | European Pat. Off. . |
| 0195098 | 9/1986 | European Pat. Off. . |
| 0230616 | 8/1987 | European Pat. Off. . |
| 3434572 | 3/1986 | Fed. Rep. of Germany . |
| 1383105 | 2/1975 | United Kingdom . |
| 2034941 | 6/1980 | United Kingdom . |
| 2118341 | 10/1983 | United Kingdom . |

OTHER PUBLICATIONS

AFIPS Conference Proceedings: 1985 National Computer Conference, by Wojcik et al., pp. 214–222 and an Abstract entitled "Database Machines: A Survey."
Design and Implimentation of a Relational DBMS for Microcomputers, The Computer Journal, pp. 391-397, vol. 28, No. 4, 1985.
UN Logiciel Pour Mini–ordinateur Dedie MINISIS, Documentaliste, vol. 21, No. 4-5, Jul.-Oct. 1984.

Primary Examiner—Raulfe B. Zache
Attorney, Agent, or Firm—Sandler, Greenblum & Bernstein

[57] ABSTRACT

An apparatus and method for furnishing the identification of potential customers that may be interested in a specific product in response to a search request. A first database contains information on, for instance, books and serials in print, in which each individual book or serial is classified. Individuals requesting information regarding specific books or serials identify themselves, along with their product interests. A second database is built up on the first enquirers, including their identification and product interests. The second database enables book publishers to determine the identification of potential customers and of their specific product interests.

13 Claims, 1 Drawing Sheet

METHOD AND APPARATUS FOR CORRELATING DATA

BACKGROUND OF THE INVENTION

The present invention relates to an apparatus for furnishing data, such as an assembly of bibliographic information concerning publications in print, the information including a subject classification for each individual publication, and means for deriving from the assembly information regarding individual publications, whereby such information can be provided on request to first enquirers. The bibliographic information will be assembled in concrete form—the form used can be for instance a traditional card index or any of the techniques used in electronic or computer technology, e.g. an electronic memory or a machine-readable tape or disc.

It is a problem that a publisher does not know who might be interested in his publications, and he can waste considerable resources in circulating material to people who have no interest in the publications. It is therefore desirable to be able to identify potential customers, i.e. those who are likely to have some sort of interest in a specific publication which is being brought out. There are already a number of assemblies of bibliographic information, including subject classifications, for publications in print. The assemblies however give no indication of who is likely to want any particular publication.

SUMMARY OF THE INVENTION

According to the invention, the apparatus includes an assembly of data on the first enquirers, including their identification and their subject interest, and means for providing from the data data identifying first enquirers having specific subject interests.

Using the invention, the data identifying the first enquirers can be given in written form, e.g. on cards, or printed out, or on a screen. The invention in effect creates market research from customer enquiries, the customers being the first enquirers. The first enquirer (the customer or user) identifies himself, and this can also include information as to how he can be contacted. Each first enquirer can be given a membership number, so that he can identify himself for further enquiries merely by giving e.g. his surname and number. The arrangement is such that the first enquirer is given access to the information in the classification for individual products, only if he identifies himself.

It is desirable, but not essential, that a first enquirer should state his subject interest (and preferably his special or product interest), in general terms. His interest can be deduced to a limited extent from his specific enquiry or the date he examines -e.g. for a book or serial, the ISBN (International Standard Book Number) or the ISSN (International Standard Serial Number) gives the scope of the specific enquiry. If the subject interest of the first enquirer is considered essential, a block can be included to ensure that the first enquirer does not have access to the database unless he gives his subject interest, and this subject interest can be related to the search, i.e. the search be confined only to the subject interest given.

First enquirers could for instance be given a booklet which enables them to define their subject interests in the way required, for later inclusion of the subject interests. Thus, a first enquirer may only be required to give:

name:
position and/or title (if a company organization):
name of company organization and full postal address:
subject of search (which, if online will be given as a consequence of following online searching procedures).
The apparatus will provide the following further information:
date of enquiry:
ISBN/ISSN of book/serial titles revealed as a result of the enquiry (e.g., displayed online or included in named reports or office prints).

In one proposal, a first database is prepared, including full bibliographic information for British books in print, this information including the ISBN, a subject description for each book and a subject level classification for each book. Enquiries will be invited from the first enquirers (customers or users); the enquiries will be expected to be for specific books or specific subjects. The first database can, however also enable the first enquirers to receive select bibliographies of books and serials. The first enquirers will be asked to fill in a standard card, which includes the subject of their interests and also the subject level of their interests (e.g. first degree, first year, etc). The results of these enquiries will be formed into a second database which will be arranged so that it can be searched for subject description and subject level classification. Publishers, the second enquirers, will be invited to make use of the second database for targeting specific onto potential users of any new publications. The information given to the second enquirers is valuable economic information. On request, a publisher can be provided with the interests of the user as to subject, readership level and content description (separately or in combination). The information given can include up-to-date market profiles of customers with an active interest in purchasing say British books, based on the precise nature of that interest. A publisher can be provided with a note of which of his titles have appeared on book lists provided to first enquirers.

In detail, the first database will be built up so as to permit the following search criteria.
For book titles:
author
title
whether pre-publication or in print
subject classification
readership level
keywords (which may be derived from title, content description and added subject indexing)
publisher and imprint
edition
price
publication date
ISBN (i.e. individual product numbering)
binding
extent
author affiliation
availability in selected key markets.
For serials:
editor(s)
title
forthcoming or current
subject classification
readership level
keywords (on the same basis as for book titles)
publication frequency price
ISSN
publisher.

The subject classifications and index headings can be derived from the British Library's UKMARC subject indicators, and if necessary, amended for non-specialist use. The subject classification can be the Dewey classification and can include the Library of Congress classification with the Library of Congress subject heading. The readership levels can be based on existing U.K. publishing definitions, and if necessary, translated on a country-by-country basis. Content descriptions will be four or five line descriptions of the book's subject matter, or possibly a table of contents. Where appropriate, this description will contain essential keywords from chapter headings etc to allow greater and more precise searching.

In detail, the simplest way of setting up the system is to build up the first and second databases on cards, with a suitable index system for searching. The amount of information is far greater than any one person can hold, and a card database can provide a simple, though rudimentary, manual system. A more sophisticated system can hold the databases in computer-readable form. Suitable programmes are available for providing the information from the respective databases to the first and second enquirers. In practice, the databases may be stored on the same disc drive.

Figure 1:
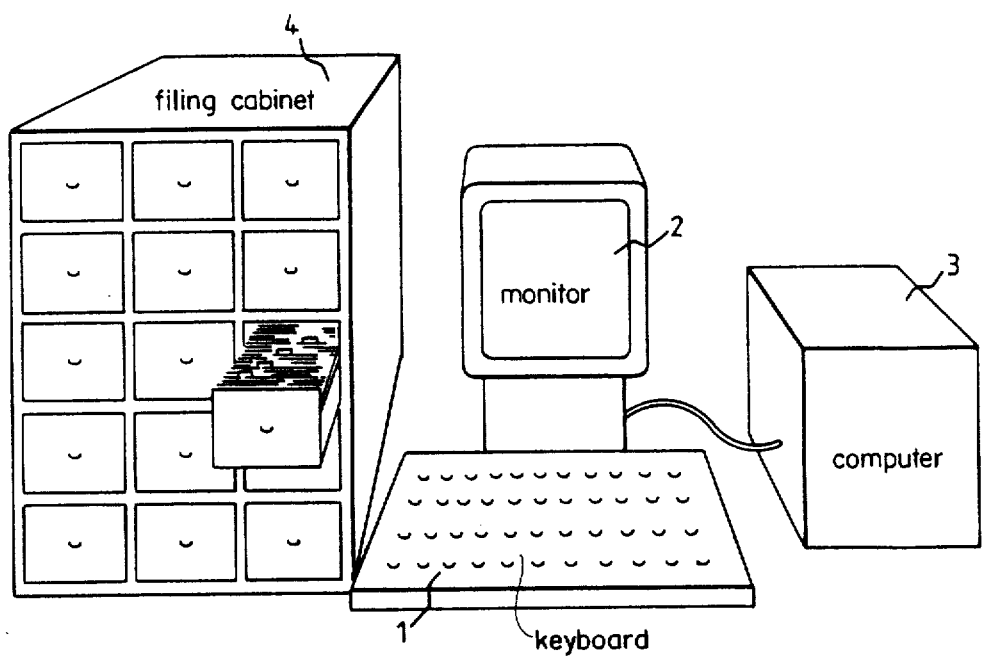
FIG. 1 is a block diagram of a preferred embodiment of the present invention.

The invention will be further described, by way of example, with reference to the accompanying drawing, FIG. 1, which is a schematic, perspective view of the apparatus in accordance with the invention.

The illustrated apparatus represents an experimental design, which will be improved as discussed below. The apparatus includes a computer input keyboard 1, a monitor 2, a computer 3 which includes a disc drive (not separately illustrated) and a multi-drawer filing cabinet 4 with drawers containing card indexes.

The disc drive contains the assembly of bibliographic information which is, input using, for instance publisher's lists of publications and the UKMARC subject indicators, as discussed above. The computer 3 can be any suitable microcomputer and suitable software is available to provide a relational database in which anything on the database can be searched. A suitable software package is the "Information Dimensions Package "DM"".

When a first enquirer asks for information regarding a publication or a subject, he is given this information, which can be brought up on the monitor 2.

The second database, the assembly of data on the first enquirers, is in the form of cards, there being a single card for each enquirer. The card will contain the information indicated above, and the cards are placed in the drawers in accordance with the UKMARC subject indicator.

On a second enquirer asking for customers who may be interested in a new publication, the UKMARC subject indicator of the new publication is determined and the card index is searched on the basis of this indicator, to reveal who has previously made enquiries relating to that subject or associated subjects. This information is presented on the individual cards, and can be read out or copied out for the second enquirer.

As the system is developed, the second database will be put on a disc drive and will be searched using the same relational database software as for the first database.

A printer can be associated with the computer 3 for printing out information, as well as (or instead of) bringing it up on the monitor 2.

The present invention has been described above purely by way of example, and modifications can be made within the spirit of the invention. Although the invention has been developed particularly for application to the publishing industry, it is also applicable to other multi-product industries, pharmaceuticals or vehicle components.

I claim:

1. A method of furnishing data, comprising the steps performed by a computer of:
   examining information relating to a plurality of subject matter;
   providing a subject classification for each subject matter;
   forming an assembly of data which includes subject classifications for the subject matter;
   requesting information from a first group of enquirers regarding individual preferences for the subject matter so as to obtain information regarding an individual enquirer's preference of the subject matter;
   assembling data obtained on the first enquirers as to an enquirer's identification and subject interests; and
   providing second enquirers with an identification of first enquirers having specific subject interests.

2. A method of furnishing data, comprising the steps performed by a computer of:
   compiling data pertaining to a plurality of subject matters to form a first assembly of data;
   storing the first assembly of data;
   obtaining data from a group of individuals which indicates each individual's interest in certain subject matter in the first assembly of data;
   creating a second assembly of data based on interests of each individual of the group;
   storing the second assembly of data;
   forming enquiries to select particular individuals from the group meeting a desired profile;
   matching the second assembly of data to the first assembly of data, based on the enquiries that form the desired profile, so as to select specific individuals that have interests for selected subject matter in the first assembly of data.

3. The method of claim 2, wherein the step of storing the first assembly of data comprises storing the compiled data in a computer memory.

4. The method of claim 2, wherein a computer terminal is used to obtain the data which indicates an interest each individual in the group has about certain subject matters in the first assembly of data.

5. The method of claim 2, wherein a computer terminal is used to input enquiries.

6. The method of claim 2, wherein a printer displays a result of the matching of the second assembly of data with the first assembly of data as a result of an obtained enquiry.

7. The method of claim 2, wherein a monitor displays a result of the matching of the second assembly of data with the first assembly of data as a result of an obtained enquiry.

8. The method of claim 2, wherein the step of matching the data in the second assembly of data to the data in the first assembly of data is performed by a computer software program algorithm that analyzes an obtained enquiry so as to match the second assembly of data to the first assembly of data.

9. An apparatus for furnishing data, comprising:
a central processor system;
a terminal that is interfaced to the central processing system for entering data into said central processor system;
a display means that is interfaced to said central processor system for displaying data from said central processor system;
a first storage means coupled to said central processor system for storing an assembly of data relating to a plurality of subject matters;
a second storage means coupled to said central processor system for storing an assembly of data indicating specific interests of said subject matters in said first storage means by individuals of a group;

enquiries that are entered into said central processor system via said terminal; and
means for matching said assembly of data in said second storage means to said assembly of data in said first storage means in response to entered enquiries so as to select individuals from said second storage means that have expressed interests in certain subject matters in said first storage means that match said enquiries.

10. The apparatus of claim 9, wherein said display means comprises a monitor.

11. The apparatus of claim 9, wherein said display means comprises a printer.

12. The apparatus of claim 9, wherein said first and second storage means comprise a computer storage device.

13. The apparatus of claim 9, wherein said matching means comprises a computer algorithm that examines all the data in said first storage means to select specific data that matches said enquiries in said second storage means.

* * * * *